(12) United States Patent
Chinn et al.

(10) Patent No.: US 8,869,890 B2
(45) Date of Patent: Oct. 28, 2014

(54) USE OF GAS-SEPARATION MEMBRANES TO ENHANCE PRODUCTION IN FIELDS CONTAINING HIGH CONCENTRATIONS OF HYDROGEN SULFIDES

(75) Inventors: Daniel Chinn, Bay Point, CA (US); Jen Kai Chen, Houston, TX (US); James Ong, Houston, TX (US); Minquan Cheng, Katy, TX (US); Oluwasijibomi O. Okeowo, Clayton, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 104 days.

(21) Appl. No.: 13/332,205

(22) Filed: Dec. 20, 2011

(65) Prior Publication Data
US 2012/0168154 A1    Jul. 5, 2012

Related U.S. Application Data

(60) Provisional application No. 61/428,292, filed on Dec. 30, 2010.

(51) Int. Cl.
*E21B 43/40* (2006.01)
*B01D 53/22* (2006.01)
*E21B 43/34* (2006.01)
*B01D 53/14* (2006.01)
*C10L 3/10* (2006.01)

(52) U.S. Cl.
CPC .............. *E21B 43/34* (2013.01); *B01D 53/229* (2013.01); *B01D 53/1468* (2013.01); *Y02C 10/10* (2013.01); *B01D 2252/204* (2013.01); *C10L 2290/545* (2013.01); *C10L 3/103* (2013.01); *B01D 2256/24* (2013.01); *C10L 2290/548* (2013.01); *C10L 3/104* (2013.01); *B01D 2257/504* (2013.01); *B01D 2257/304* (2013.01)

USPC .................... 166/267; 166/75.12; 166/105.5; 166/266; 166/403

(58) Field of Classification Search
None
See application file for complete search history.

(56) References Cited

U.S. PATENT DOCUMENTS

| 4,466,946 | A | 8/1984 | Goddin et al. |
|---|---|---|---|
| 5,407,466 | A | 4/1995 | Lokhandwala |
| 6,932,859 | B2 | 8/2005 | Koros et al. |
| 7,247,191 | B2 | 7/2007 | Koros et al. |
| 2006/0131212 | A1 | 6/2006 | Dahlberg et al. |
| 2010/0186586 | A1 | 7/2010 | Chinn et al. |

OTHER PUBLICATIONS

Anjan K. Datta et al., "Optimization of membrane unit for removing carbon dioxide from natural gas" Journal of Membrane Science, 2006, vol. 283, pp. 291-300.

(Continued)

*Primary Examiner* — Zakiya W Bates
(74) *Attorney, Agent, or Firm* — Richard J. Shulte; Frank C. Turner

(57) ABSTRACT

A method and system for processing produced fluids from a subterranean reservoir is disclosed. The system comprises:
(a) a separator for separating produced fluids from a subterranean reservoir into associated gases, water and crude oil,
(b) a membrane which receives at least a portion of the associated gases containing the hydrogen sulfide and separates the gas into a permeate stream enriched in hydrogen sulfide and carbon dioxide and a retentate stream depleted in hydrogen sulfide and carbon dioxide;
(c) an amine unit for removing carbon dioxide and hydrogen sulfide from the retentate stream; and
(d) a sour gas injection unit for injecting at the permeate stream in an underground formation.

9 Claims, 2 Drawing Sheets

(56) References Cited

OTHER PUBLICATIONS

International Search Report and Written Opinion for PCT/US2011/066291 mailed Sep. 27, 2012 [T-8303].

SPE86605 (Abou-Sayed et al., 2004, The Management of Sour Gas by Underground Injection-Assessment, Challenges and Recommendations).

SPE97628 (Abou-Sayed et al., 2005, An Assessment of Engineering, Economical and Environmental Drives of Sour Gas Management by Injection).

USE OF GAS-SEPARATION MEMBRANES TO ENHANCE PRODUCTION IN FIELDS CONTAINING HIGH CONCENTRATIONS OF HYDROGEN SULFIDES

This Application is based upon and claims the benefit of U.S. Provisional Application 61/428,292 filed Dec. 30, 2010, the entire contents of which are incorporated herein by reference.

TECHNICAL FIELD

The present invention relates generally the production of hydrocarbons from subterranean reservoirs, and more particularly, to the separation of hydrocarbons from produced fluids that contain high hydrogen sulfide ($H_2S$) content.

BACKGROUND

Hydrocarbon-containing produced fluids from many subterranean reservoirs contain high quantities of hydrogen sulfide gases. Amine units are conventionally used to remove a large portion of the hydrogen sulfide from associated gases stripped from these produced fluids. Amine units or plants are among the most expensive and complex operating pieces of equipment in hydrocarbon production plants that need to process the high-$H_2S$ associated gas. There are a number of known manners of debottlenecking a production facility where amine units are operating at capacity. For example, switching the amine solvent from diethanolamine (DEA), to methyldiethanolamine (MDEA), in the existing equipment could boost $H_2S$ capacity by 10-15%. Also, intercoolers could be added to the amine plant to mitigate heat generation problems from the reaction between DEA or MDEA with the $H_2S$. There is a need for other methods or processes for enhancing the production capacity of a hydrocarbon production plant without upgrading the capacity of amine units. Alternatively, there is a need for hydrocarbon production plants that can process greater quantities of hydrocarbons while minimizing the capacity of amine units.

SUMMARY OF THE DISCLOSURE

A system for processing produced fluids from a subterranean reservoir is disclosed. The system comprises:
  (a) a separator for separating produced fluids from a subterranean reservoir into associated gases, water and crude oil, the associated gases containing at least 1 to 30% hydrogen sulfide;
  (b) a membrane which receives at least a portion of the associated gases containing the hydrogen sulfide and separates the gas into a permeate stream enriched in hydrogen sulfide and carbon dioxide and a retentate stream depleted in hydrogen sulfide and carbon dioxide but enriched in hydrocarbon gases;
  (c) an amine unit for removing carbon dioxide and hydrogen sulfide from the retentate stream; and
  (d) a sour gas injection unit for injecting at least a portion of the permeate stream into an underground formation;
wherein the removal of the hydrogen sulfide and carbon dioxide from the associated gas by the membrane allows the amine unit to process a greater quantity of associated gases than if the hydrogen sulfide and carbon dioxide had not been removed by the membrane.

A method for processing produced fluids from a subterranean reservoir is disclosed:

(a) separating produced fluids from a subterranean reservoir into associated gases, water and crude oil, the associated gases containing at least 1 to 30% hydrogen sulfide;
  (b) utilizing a membrane to separate at least a portion of the associated gases into a permeate stream enriched in hydrogen sulfide and carbon dioxide and a retentate stream depleted in hydrogen sulfide and carbon dioxide and enriched in hydrocarbon gases;
  (c) utilizing an amine unit to separate at least a portion of the associated gases into a stream enriched in hydrogen sulfide and carbon dioxide and a stream depleted in hydrogen sulfide and carbon dioxide and enriched in hydrocarbon gases; and
  (d) injecting at least a portion of the permeate stream in an underground formation.

BRIEF DESCRIPTION OF THE DRAWINGS

These and other objects, features and advantages of the embodiments disclosed will become better understood with regard to the following description, pending claims and accompanying drawings where:

DETAILED DESCRIPTION

Figure 1:
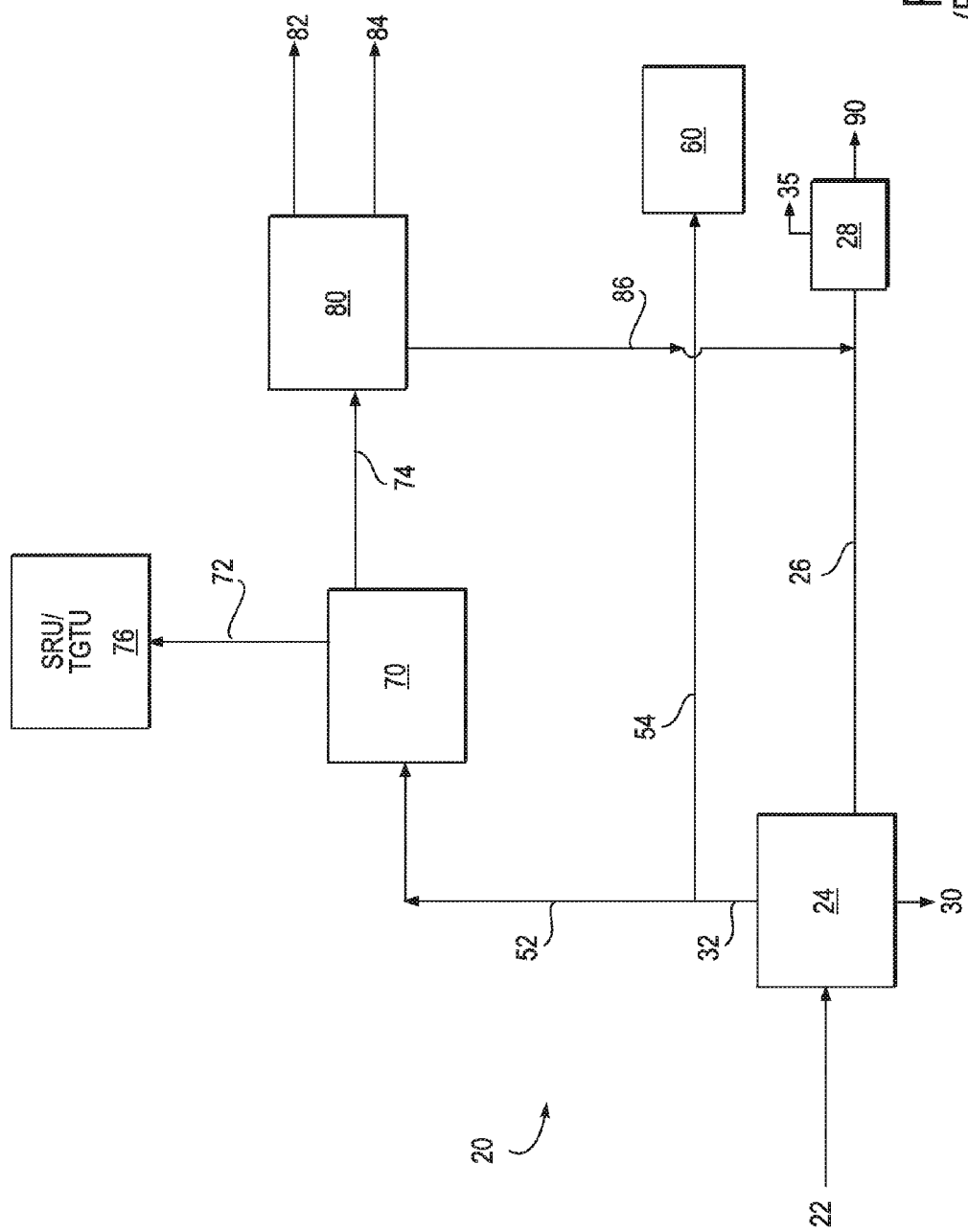
FIG. 1 is a block diagram of a conventional production facility for treating hydrocarbon containing produced fluids high in acid gases, such as hydrogen sulfide ($H_2S$) and carbon dioxide ($CO_2$), to produce stabilized oil, sales gases and liquefied petroleum gas (LPG). The production facility includes oil production which occurs with both sour-gas processing using an amine unit and a sour gas injection unit.

FIG. 1 illustrates an exemplary conventional production facility 20 for producing hydrocarbons from a subterranean reservoir. The produced fluids from the subterranean reservoir contain a relative high content of hydrogen sulfide ($H_2S$) which must be handled during processing of the produced fluids into saleable hydrocarbon products. For the purposes of this application, high hydrogen sulfide content refers to produced fluids which produce associated gases which contain at least 4% hydrogen sulfide by volume.

Produced fluids 22 from one or more subterranean reservoirs (not shown) are delivered to facility 20. A separation unit 24 receives the produced fluids and is used to separate crude oil 26, water 30 and associated gases 32 from the produced fluids 22. Separation unit 24 may include a number of different types of equipment for separating the fluids such as a water/gas/crude oil separator. As is well known to those skilled in the art of hydrocarbon production, equipment in separation unit 24 may include by way of example and not limitation single or multi-stage separators, free water knockout tanks, oil stabilization columns, gunbarrel or oil settling tanks, control valves (pressure, level, temperature, flow), compressors, pumps, stock tanks, water skimmers etc.

Separated crude oil 26 from separation unit 24 can be further treated to become stabilized oil such as by using a conventional stabilizer column 28 to produce stabilized oil 90 and light gases 35. Stabilized oil refers to a hydrocarbon product that is generally ready for transport to a refinery for further processing into desired products such as naphtha, gasoline, diesel, etc. This transport, by way of example and not limitation, may be through a pipeline, by way of crude oil tanker across a large body of water, by way of a vehicular tanker, etc. The term "stabilized oil" generally refers to oil that is substantially free of dissolved hydrocarbons gases. Such oil may be stored in a vented tank at atmospheric pressure or transported through a pipeline. Actual specifications for stabilized oil may vary but often the stabilized oil has a Reid Vapor Pressure (RVP) of 10-12 psia. $H_2S$ specification may vary. However, by way of example and not limitation, $H_2S$ content may be on the order of 10-60 parts by million.

Water 30 removed by separation unit 24 may be disposed of in a number of ways. The water may be injected in a subterranean formation for either disposal or to assist in the pressure maintenance of a reservoir. Or else, the water could be further treated to remove contaminants such as dispersed oil, dissolved or soluble organic components, treatment chemicals (biocides, reverse emulsion breakers, corrosion inhibitors), produced solids (sand, silt, carbonates, clays, corrosion products), scales, bacterial, metals (iron, manganese, etc.), salts, and NORM (naturally occurring radioactive material), sodium content, and boron content such that the water may be suitable for irrigation. Or if even further treated, the water may be turned into potable water suitable for consumption by humans and animals. Other non-limiting uses of the separated and treated water might include boiler feed water for steam generation.

Associated gases typically have a composition, by way of example and not limitation, including water, carbon dioxide, hydrogen sulfide, nitrogen, methane, ethane, propane, normal and iso-butane, normal and iso-pentane, normal and iso hexane, etc. The associated gases are removed from the produced fluids by flashing in one or more gas-oil-water separator vessels operating at successively lower pressures. Associated gases from the overhead of each separator vessels may be recompressed, cooled, and combined to a single stream for further processing. Associated gases 32 are split into a first production stream 52 and a second sour gas injection stream 54, both of same general composition, temperature, and pressure.

Sour gas reinjection stream 54 is sent to sour gas injection unit 60. Sour gas injection unit 60 includes compressors, inter-coolers, and pumps which increase the pressure of the stream 54 to approximately 1000 psia to 10,000 psia depending on the pressure needed to inject the sour gas into a reservoir (not shown).

Production stream 52 of associated gases 32 is sent to an amine plant or unit 70. Amine plant 70 strips acid gases, such as $H_2S$ and $CO_2$, from the production stream 34 producing an enriched acid gas stream 72 and an enriched hydrocarbon stream 74. As a non-limiting example, the acid gas stream 72 may include a small amount of hydrocarbons, typically methane ($C_1$), water vapor, carbon dioxide ($CO_2$), and hydrogen sulfide ($H_2S$). Acid gas stream 72 is then sent to a sulfur recovery/tail gas treating unit 76 (SRU/TGTU), which is well known to those skilled in the art of treating acid gases, that include relative high concentrations of hydrogen sulfide ($H_2S$). The SRU/TGTU unit 76 may convert at least a portion of the $H_2S$ into elemental sulfur, which may be subsequently transported and sold for commercial uses like fertilizer and sulfuric acid.

Hydrocarbon enriched stream 74 is passed to hydrocarbon gas treatment plant 80 where hydrocarbon gases, C1, C2, C3, C4, C4+ are sent to a deethanizer column, followed by a depropanizer column, and then a debutanizer column to be separated into different saleable products. These separated gases typically include sales gases 82, which comprise methane, ethane, nitrogen, with small amounts of propane and higher hydrocarbons. Also, a liquefied petroleum gas stream 84 including LPG (C3, C4) is typically separated out. A stream 86 of heavier gases (C4+) is also separated out by gas treatment plant 80. Fluids of stream 86 are often liquid at ambient conditions (20° C., 1 atmosphere). This liquid stream 86 can be combined with crude oil 26 and sent to stabilizer column 28 to produce a stabilized stream 90 of crude oil that is suitable for transport, as described above.

Figure 2:
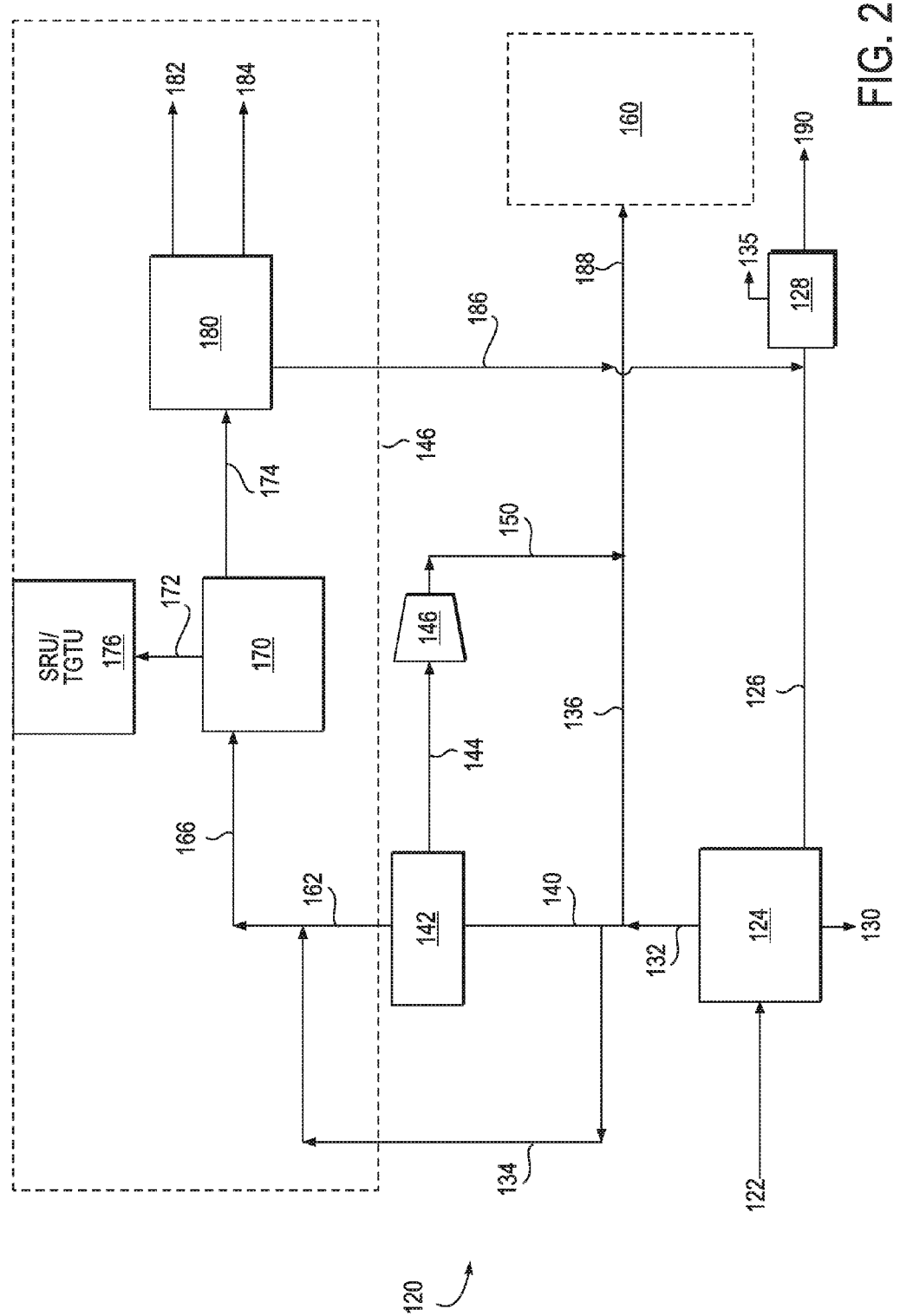
FIG. 2 is a block diagram of a retrofit production facility wherein a membrane unit has been added to separate out a portion of $H_2S$ and $CO_2$ from associated gases which is injected into a subterranean formation so that an amine unit does not have to process as much hydrogen sulfide thus allowing for increased oil production for the particular capacity of the amine unit.

FIG. 2 shows a retrofitted production facility 120 wherein similar components to those of production facility 20 have reference numerals which are incremented by 100. Alternatively, production facility 120 could be a new production unit that is initially built including membranes for the separation of acid gases from associated gases. The amine plant 170 is assumed generally identical to amine plant 70 in its capacity to remove $H_2S$. Also, capacity of a sour gas injection plant 160 to inject gas is also essentially the same as sour gas injection plant 60. Other components in the facility 120 may be changed from facility 20 to enhance their operating capacities while maintaining the capacities of amine plant 170 and sour gas injection plant 160. Typically, the cost of retrofitting amine plant 170 and sour gas injection plant 160 is higher than the other components or units. Exemplary capacities and compositions of gases from computational trials using software simulation will be described later and are captured in Table 1 below with respect to facilities 20 and 120.

A stream of produced fluids 122 is received from a subterranean reservoir (not shown) by a separation unit 124. Produced fluids 122 are separated into a stream 126 of crude oil, a stream 130 of produced water and a stream 132 of associated gases. Stream 132 of associated gases is split into a production stream 134, a gas injection stream 136 and a membrane feed gas stream 140. Production facility 120 is partially retrofit by adding a membrane separation unit 142 which separates a portion of membrane feed gas stream 140 of associated gases into a permeate stream 144 and a retentate stream 162. Membrane separation unit 142 includes membranes, which are selective for both $H_2S$ and $CO_2$ over hydrocarbons. Preferably the membranes have a mixed-gas $H_2S/CH_4$ selectivity of 10 or greater when measured at 35° C. and 300 psig feed. In another embodiment, the selectivity is at least 20. In yet another embodiment, the selectivity is at least 40. Also, ideally, the $H_2S$ permeance is 0.4-times or greater than the $CO_2$ permeance when measured at 35° C. and 300 psig feed. In another embodiment, the $H_2S$ permeance is greater than 0.6 times the $CO_2$ permeance. And in yet another embodiment, the $H_2S$ permeance is greater than 0.9 times the $CO_2$ permeance Non-limiting examples of membrane materials that correspond to the above criteria include: cellulose acetate, cellulose triacetate, 6FDA:DAM; DABA (3:2) (polymide), crosslinked 6FDA:DAM:DABA (3:2), and polyurethanes. An example of crosslinked membrane having −6FDA:DAM: DABA (3:2) is found in US Pat. Publication No. 2010/0186586A1 and U.S. Pat. Nos. 6,932,859B2, and 7,247,191B2, which are all hereby incorporated by reference in their entireties. With respect to the form of the membrane, by way of example and not limitation, the form of the membrane may be a hollow fiber or spiral wound. Those skilled in the art of membrane separation of gases will appreciate that other configuration of membranes may be used to separate gases.

Table 1 shows some exemplary data of a lab-scale membrane exhibiting preferential selectivity of $H_2S$ and $CO_2$ over methane. Again this membrane is similar to those disclosed in US Pat. Publication No. 2010/0186586A1, and U.S. Pat. Nos. 6,932,859B2, and 7,247,191B2.

TABLE 1

GAS SEPARATION USING 6FDA:DAM:DABA (3:2) Crosslinked Membrane

| FEED | Temp (deg C.) | Feed (psig) | Permeance CH4 (GPU) | Permeance $CO_2$ (GPU) | Permeance $H_2S$ (GPU) |
|---|---|---|---|---|---|
| Pure Gas CH4 and Pure Gas $CO_2$ | 35 | 300 | 1.2 | 55 | N/A |
| 4.1% $H_2S$, 21% C02 74.9% CH4 | 38 | 905 | 0.55 | 13 | 5.6 |
| 20.5% $H_2S$, 3.9% $CO_2$, and 75.6% CH4 | 38 | 300 | 0.85 | 22 | 13 |
| | 38 | 605 | 0.71 | 17 | 10 |
| | 54 | 300 | 0.98 | 22 | 12 |
| | 54 | 575 | 0.87 | 18 | 10 |

Modules have 3 fibers, 260 micron 00, 12.5 cm L (effective area = 3.06 cm2)
Shell-side feed, Permeate pressure = 0 psig, Stage Cut <1.2%, Feed Flow: 244-256 scc/min Membrane gas feed stream 140 is separated by membrane separation unit 142 into a permeate stream 144 enriched in acid gases, such as $CO_2$ and $H_2S$, and a retentate stream 162 which is enriched in hydrocarbon gases, relative to input membrane feed gas stream 140.

Permeate stream 144, which drops in pressure as it passes through membrane separation unit 142, is sent to a compressor 146. The pressure in stream 144 is increased to produce an acid gas enriched stream 150 which is combined with reinjection stream 136 to form a injection stream 188. Stream 188 is sent to a sour gas reinjection unit 160 to be injected into a subterranean formation (not shown). Injection stream 188, which has the same flow rate but a higher $H_2S$ content than stream 86 of FIG. 1, is injected into a subterranean reservoir (not shown) and provides the long-term advantages of improved sweep efficiency than streams with lower $H_2S$ content, $CO_2$, or sweet gas. References disclosing the improvement of injecting $H_2S$-gas mixtures vs. $CO_2$ and sweet gas include SPE86605 (Abou-Sayed et al., 2004, The Management of Sour Gas by Underground Injection-Assessment, Challenges and Recommendations) and SPE97628 (Abou-Sayed et al., 2005, An Assessment of Engineering, Economical and Environmental Drives of Sour Gas Management by Injection). This improved efficiency is due to the increased viscosity and higher density of the injected sour gas—leading to more effective voidage replacement and sweep efficiency.

Retentate stream 162, enriched in hydrocarbon gas concentration, and production stream 134 of the original composition of associated gases, are combined to form stream 166. Stream 166 is passed to amine plant 170 to strip acid gases from stream 166. A stream 172 of enriched acid gases is subsequently produced by amine plant 170. Stream 172 is passed to SRU/TGTU unit 176 so that sulfur may be processed and removed from enhanced acid gas stream 172. A sweetened hydrocarbon gas stream 174 is produced after amine plant 170 removes a large portion of the acid gases from stream 166. As described above, stream 174 is sent to gas processing unit 180 where gases are separated into a sales gas stream 182, a LPG stream 184 and a $C_4+$ stream 186. The $C_4+$ stream, which is generally liquid when sufficiently cooled and at ambient conditions, is combined with gas stream 126 and processed to form a stabilized crude oil stream 190 and light gases ($C_1$-$C_4$) in stream 135 in stabilizer column 135.

Typically the most valuable products produced by facility 120 are the stream 190 of crude oil stream 184 of LPG and stream 182 of sales gas. A facility 20 can be retrofitted by adding membrane unit 142 to remove a substantial portion of the $H_2S$ and $CO_2$ from the associated gases so that amine plant 170 has a lower load of acid gases to remove for a given amount of produced fluid and stabilized oil produced. Also, the sour gas injected by sour gas injection unit 160 carries a higher percentage of $CO_2$ and $H_2S$ gas than without the use of the membrane unit 142. Higher levels of $H_2S$ and $CO_2$ in this injection stream is beneficial, since both $H_2S$ and $CO_2$ can provide longer-term benefits of more efficient displacement of oil in a subterranean reservoir.

Computer models representative of production facilities 20 and 120 were made. The acid-gas ($CO_2$+$H_2S$) capacity of amine plant 70 and 170 were capped at an acid gas capacity of 72 million standard cubic feet per day (MMSCFD). Sour gas injection units 60 and 160 were limited to a capacity of 275 MMSCFD of sour gas streams 54 or 188 to be injected. Computational simulations were made on separation of produced fluids utilizing conventional facility 20 and retrofit facility 120 that includes the acid gas membrane separation unit 142. MMMTPA refers to million metric tons per annum.

TABLE 2

Computational Results from Conventional and Retrofit Facilities 20 and 120

| Stream | Quantity | Composition by Volume | Stream | Quantity | Composition by Volume | % increase in quantity |
|---|---|---|---|---|---|---|
| Produced Fluid Stream 22 | 17.3 MMMTPA | | Produced Fluid Stream 122 | 20.9 MMMTPA | | 21 |
| Crude Oil stream 26 Produced water stream 30 | 9.1 MMTPA | | Crude Oil stream 126 Produced water stream 130 | 11 MMTPA | | 21 |

TABLE 2-continued

Computational Results from Conventional and Retrofit Facilities 20 and 120

| Stream | Quantity | Composition by Volume | Stream | Quantity | Composition by Volume | % increase in quantity |
|---|---|---|---|---|---|---|
| Associated gas stream 32 | 654 MMSCFD | 16% $H_2S$ 3% $CO_2$ 0.9% $N_2$ Bal HC | Associated gas stream 132 | 789 MMSCFD | 16% $H_2S$ 3% $CO_2$ 0.9% $N_2$ Bal HC | 21 |
| Reinjection stream 54 | 275 MMSCD | 16% $H_2S$ 3% $CO_2$ 0.9% $N_2$ Bal HC | Reinjection stream 188 | 275 MMSCFD | 23.8% $H_2S$ 5.1% $CO_2$ 0.9% $N_2$ Bal HC | 0 |
| Production stream 52 | 379 MMSCFD | 16% $H_2S$ 3% $CO_2$ 0.9% $N_2$ Bal HC | Production stream 134 | 239 MMSCFD | 16% $H_2S$ 3% $CO_2$ 0.9% $N_2$ Bal HC | −37 |
| | | | Membrane feed stream 140 | 379 MMSCFD | 16% $H_2S$ 3% $CO_2$ 0.9% $N_2$ Bal HC | |
| | | | Permeate Stream 144 | 103.4 MMSCFD | 38.4% $H_2S$ 8.7% $CO_2$ 0.7% $N_2$ Bal HC | |
| | | | Retentate Stream 162 | 275.6 MMSCFD | 7.9% $H_2S$ 1.2% $CO_2$ 1.1% $N_2$ Bal HC | |
| Acid Gas stream 72 | 79 MMSCFD | 78.3% $H_2S$ 15.4% $CO_2$ 6% $H_2O$ 0.3% $C_1$ | Acid Gas stream 172 | 74.5 MMSCFD | 79.5% $H_2S$ 14.2% $CO_2$ 6% $H_2O$ 0.2% $C_1$ | −5.7 |
| Enriched hydrocarbon stream 74 | 307 MMSCFD | | Enriched hydrocarbon stream 174 | 444 MMSCFD | | 45 |
| Sales gas stream 82 | 248 MMSCFD | 4 ppm $CO_2$ 1 ppm $H_2S$ | Sales gas stream 182 | 358 MMSCFD | 4 ppm $CO_2$ 1 ppm $H_2S$ | 44 |
| LPG stream 84 | 1.9 MMPTA | | LPG stream 184 | 2.7 MMPTA | | 42 |
| C4+ stream 86 | 1.2 MMPTA | | $C_{4+}$ stream 186 | 1.7 MMPTA | | 42 |
| Combined stabilized crude stream 90 | 10.3 MMTPA (209 mbd) | | Combined stabilized crude stream 190 | 12.7 MMTPA (259 mbd) | | 23 |

Note that stream 190 of stabilized crude oil has been increased in flow rate by 23% over that of stream 90 of stabilized crude oil, with the addition of a gas-separation membrane that removes ~60% of the $H_2S$ from the associated gas, without increasing the capacity of either amine plant (70, 170) or sour gas injection unit (60, 160). Both of the SGI compression, amine plants, and SRU/TGTU are running near 100% design capacity. One notable difference (see FIGS. 1 and 2) is that the % $H_2S$ and % $CO_2$ in the re-injection gas stream (54, 188) have increased in the membrane case, even as the total volume flow is the same. With the addition of the membrane, greater oil production may be realized with the same amine plant, SRU/TGTU Plant, and SGI capacity provided that the sweet gas facilities (shown as unit 70, 170 in FIGS. 1 and 2) and front-end upstream facilities (oil/gas/water separators, wet gas compressors, and old stabilization towers, shown as units 24, 124 in FIGS. 1 and 2) have sufficient capacity or expanded capacity. Again, if a new production facility 120 is to be built, it can be built initially utilizing a membrane unit 142 for removal of a portion of the $H_2S$ and $CO_2$ so that the capacity of the amine plant 170 may be reduced as compared to a plant 70 not utilizing membranes to separate out acid gases from associated gases.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A system for processing produced fluids from a subterranean reservoir, the system comprising:
   (a) a separator for separating produced fluid from a subterranean reservoir into a primly stream of associated gases, water and crude oil, the primary stream of associated gases containing carbon dioxide and at least 4 hydrogen sulfide by volume;
   (b) a membrane which receives and separates a first portion of the associated gas stream portion into a permeate stream enriched in hydrogen sulfide and carbon dioxide and a retentate stream depleted in hydrogen sulfide and carbon dioxide but enriched in hydrocarbon gases;
   (c) an amine plant which receives a second portion of the associated gas stream and the retentate stream, the amine plant being capable of removing carbon dioxide and hydrogen sulfide from the second portion and retentate stream and producing a hydrocarbon enriched stream; and (d) a sour gas injection unit which receives a third portion of the associated gas stream and the permeate stream and is capable of reinjecting the third portion of the associated gas stream and permeate stream into a subterranean reservoir;

wherein the combined retentate stream and second portion are lower in hydrogen sulfide concentration than the primary stream of associated gases; and wherein the combined permeate stream and third portion are higher in hydrogen sulfide concentration than the primary strewn of associated gases.

2. The system of claim 1 wherein:
the primary stream of associated gases have a hydrogen sulfide content of at least 10% by volume.

3. The system of claim 1 wherein;
the primary stream of associated gases have a hydrogen sulfide content of at least 20% by volume.

4. The system of claim 1 further comprising:
a compressor which compresses the permeate stream so that it may be combined with the third portion of the associated gas stream prior to being received by the sour gas injection unit.

5. The system of claim 1 wherein:
the membrane is a one-stage membrane.

6. A method for processing produced fluids from a subterranean reservoir comprising:
  (a) separating produced fluids from a subterranean reservoir into a primary stream of associated gases, water and crude oil, the primary stream of associated gases containing al, least 1 to 30% hydrogen sulfide by volume and carbon dioxide;
  (b) splitting the primary stream of associated gases into first, second and third portions of associated gases;
  (c) utilizing a membrane to separate the first portion of associated gases into a permeate stream enriched in hydrogen sulfide and carbon dioxide and a retentate strewn depleted in hydrogen sulfide and carbon dioxide and enriched in hydrocarbon gases;
  (d) combining the second portion of associated gases and the retentate stream and treating the combined second portion and retentate stream using an amine plant to produce a hydrocarbon enriched stream and a stream of carbon dioxide and hydrogen sulfide;
  (e) converting the stream of carbon dioxide and, hydrogen sulfide into a sulfur product;
  (f) combining the third portion and the permeate stream and reinjecting the third portion and permeate stream into a subterranean formation.

7. The method of claim 6 wherein:
the permeate stream is compressed to increase pressure prior to being combined with the third portion of associated gases.

8. The method of claim 7 wherein:
wherein the combined retentate stream and second portion are lower in hydrogen sulfide concentration than the primary stream of associated gases.

9. The method of claim 7 wherein:
wherein the combined permeate stream and third portion are higher in hydrogen sulfide concentration than the primary strewn of associated gases.

* * * * *

UNITED STATES PATENT AND TRADEMARK OFFICE
CERTIFICATE OF CORRECTION

| | | |
|---|---|---|
| PATENT NO. | : 8,869,890 B2 | Page 1 of 1 |
| APPLICATION NO. | : 13/332205 | |
| DATED | : October 28, 2014 | |
| INVENTOR(S) | : Daniel Chinn et al. | |

It is certified that error appears in the above-identified patent and that said Letters Patent is hereby corrected as shown below:

In the Claims

Col. 8, line 53, change "primly" to --primary--
Col. 8, line 55, change "4" to --4%--
Col. 9, line 11, change "strewn" to --stream--
Col. 9, line 30, change "al," to --at--
Col. 10, line 6, change "strewn" to --stream--
Col. 10, line 13, delete ","
Col. 10, line 29, change "strewn" to --stream--

Signed and Sealed this
Tenth Day of February, 2015

Michelle K. Lee
*Deputy Director of the United States Patent and Trademark Office*